Figure 1:
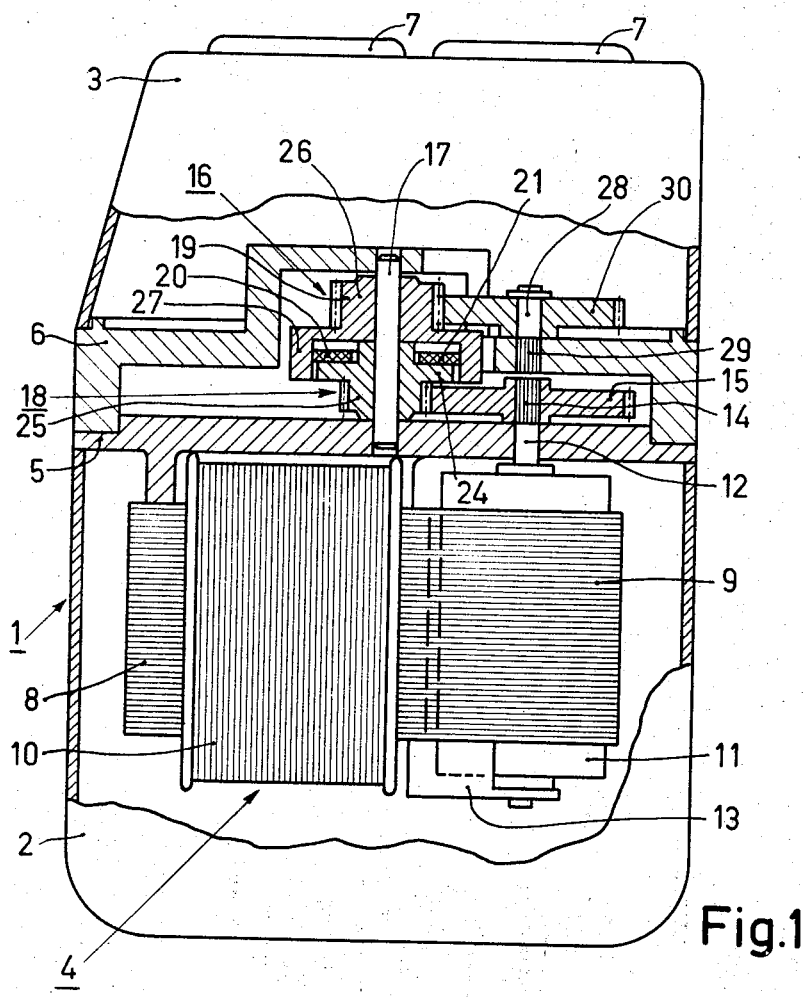

United States Patent [19]
Beusink

[11] 3,824,415
[45] July 16, 1974

[54] APPARATUS EQUIPPED WITH A SINGLE-PHASE SYNCHRONOUS MOTOR AND A STARTING COUPLING

[75] Inventor: Bernard Joseph Beusink, Clementinalaan, Netherlands

[73] Assignee: U.S. Philips Corporation, New York, N.Y.

[22] Filed: Nov. 12, 1973

[21] Appl. No.: 414,979

[30] Foreign Application Priority Data
Nov. 28, 1972  Netherlands .................. 7216084

[52] U.S. Cl. .............................. 310/41, 310/162
[51] Int. Cl. ....................................... H02k 7/118
[58] Field of Search ............ 310/41, 74, 162–164, 310/84

[56] References Cited
UNITED STATES PATENTS

| | | |
|---|---|---|
| 3,284,649 | 11/1966 | Barlow .............................. 310/41 |
| 3,335,302 | 8/1967 | Van der Linden ................. 310/41 |
| 3,354,993 | 11/1967 | Van der Lely .................... 310/41 X |
| 3,423,612 | 1/1969 | Brundage ......................... 310/41 X |
| 3,691,413 | 9/1972 | Russell ............................. 310/41 |
| 3,710,155 | 1/1973 | Juilleu-Davin ................... 310/41 |

Primary Examiner—D. F. Duggan
Attorney, Agent, or Firm—Frank R. Trifari

[57] ABSTRACT

Electrical appliance, equipped with a singlephase synchronous motor and a starting coupling with fly weights. Measured from the axis of rotation of the starting coupling, the angle between the axis of rotation of a fly weight and the points where the fly weight frictionally cooperates with the driven coupling section, is between 150° and 180° and the angle between the said axis of rotation and the centre of gravity of the fly weight is substantially 90°.

2 Claims, 4 Drawing Figures

APPARATUS EQUIPPED WITH A SINGLE-PHASE SYNCHRONOUS MOTOR AND A STARTING COUPLING

The invention relates to an apparatus, in particular an electrical domestic appliance such as a dry-shaving apparatus, a hair dryer, a mixer, etc., equipped with a single-phase synchronous motor and a starting coupling, comprising a rotatable primary section having one or more eccentrically journalled fly weights, and a rotatable secondary section which cooperates therewith and which is to be driven thereby.

In apparatus of this type it is always required that the tool of the appliance eventually to be driven has a predetermined direction of rotation. Single-phase synchronous motors of small dimensions have rotors with a relatively small moment of inertia. If at the instant that the motor is connected to the a. c. mains the motor is in an appropriate position, the motor may be self-starting, i.e., the motor starts to rotate immediately, as the case may be after a few oscillations, without any further special starting means. It is obvious that this property of small single-phase synchronous motors can only be utilized with advantage in a small domestic appliance if the tool to be driven does not or not substantially add to the reduced inertia at the rotor shaft. The reduced inertia at the rotor shaft is to be understood to mean a fictitious inertia, which exerts the same influence on the dynamic behaviour of the rotor as the inertia of the rotary masses coupled to the rotor shaft.

Single-phase synchronous motors furthermore possess the property that at the synchronous speed the motor is capable of delivering a torque which is substantially greater than during acceleration or starting of the motor. However, the torque to be produced by the motor should never exceed a certain maximum value, as otherwise the motor will suddenly stall. Said property of single-phase synchronous motors is especially significant in devices with a great, reduced inertia at the rotor shaft.

In view of the above mentioned properties and problems of single-phase synchronous motors, many starting couplings have been proposed. The object of such couplings is always to provide such a transmission between the rotor shaft and the tool to be driven, that during starting of the rotor the maximum available starting torque is not exceeded and also that at the synchronous speed the maximum available torque is never exceeded. In theory, a normal friction coupling with centrifugal weights would meet the requirements. However, an ever recurring practical problem with this type of coupling is that the magnitude of the slip moments occurring during starting is directly related to the prevailing coefficient of friction which exists between the coupling section which are moving relative to each other. In practice it appears that the magnitude of the coefficient of friction may vary substantially owing to external causes, such as the varying relative humidity of the atmosphere, changes in surface condition of the contacting coupling sections and the effect of the speed of relative motion of the sections which rub against each other on the coefficient of friction. Observations have revealed that as a result of this the friction factor may readily vary by a factor two. This means that the moment of slip of the coupling then also changes by a factor two. This might be overcome by overdimensioning the synchronous motor by a factor two. This is a direct consequence of the fact that during operation the coupling should never produce slip, which means that during operation the primary and secondary coupling sections should be immovable relative to each other.

It is obvious that overdimensioning of the motor by a factor two is not an attractive prospect for the use of single-phase synchronous motors in electrical domestic appliances. Indeed, such appliances are typical mass products, which both in respect of price, quality and lifetime should be able to compete with similar commercially available appliances, and moreover, they should permit of inexpensive and rational manufacture, using a minimum of materials.

A further property of single-phase synchronous motors is that the motor has no preferred direction of rotation. Consequently, the coupling must function both as a starting coupling and as a reverse-motion stop.

It is an object of the invention to provide an apparatus of the type mentioned in the preamble, which is equipped with a coupling with an accurately reproducible slip moment and is also capable of serving as reverse-motion stop, and the invention is characterized in that the angle, measured from the axis of rotation of the primary coupling section, between the bearing axis of the fly weight and the point where the fly-weight cooperates with the secondary coupling section lies between 150° and 180°.

As the bearing axis of the fly weight and the point, to be referred to as friction point hereinafter, where the fly weight cooperates with the secondary coupling section are substantially diametrically opposed, the normal force in the friction point provides only a very small contribution to the balance of moments of the fly weight, so that the friction force is a certain fraction of the mass force acting in the centre of gravity of the fly weight and therefore does not or at least not substantially depend on the magnitude of the coefficient of friction existing between the fly weight and the secondary coupling section. Moreover, such a coupling is readily suitable as a return motion stop, as will be explained in the description associated with the Figures.

Of course, it is of importance that the actual coupling is constructed so as to provide a mimimum contribution to the reduced mass inertia at the rotor axis. In this respect an embodiment of the invention is of importance which is characterized in that the angle, measured from the axis of rotation of the primary coupling section, between the bearing axis of the fly weight and the centre of gravity thereof, is substantially 90°.

Figure 2:
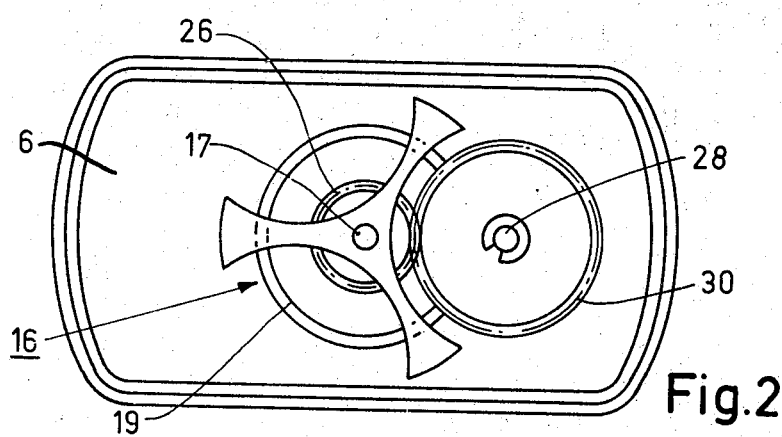
Figure 3:
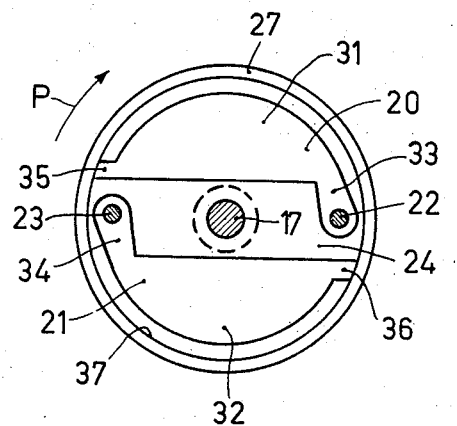
Figure 4:
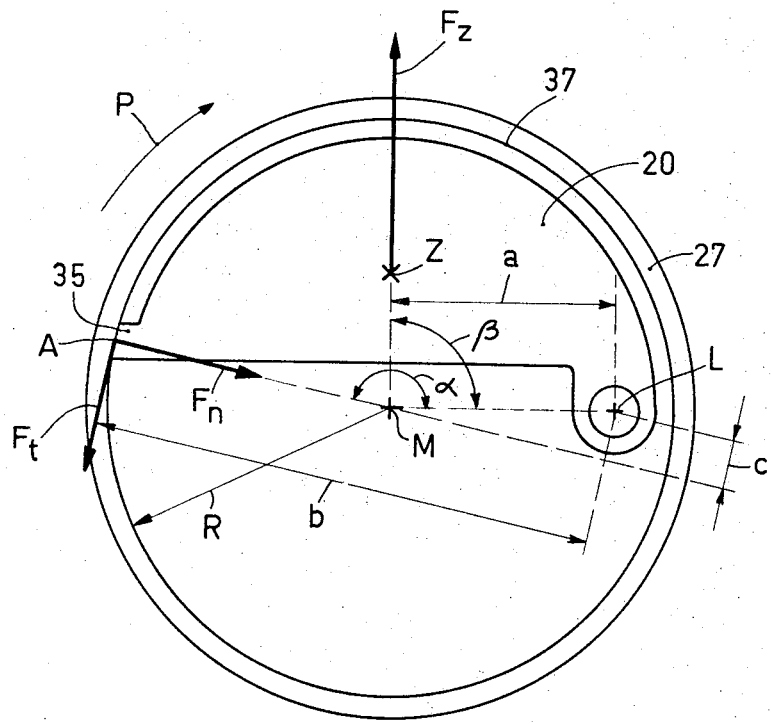

The invention will now be described in more detail, by way of example, with reference to the drawing, in which FIG. 1 is a part side view, part cross-sectional view of an electric dry-shaving apparatus, FIG. 2 is a top plan view of the dry-shaving apparatus of FIG. 1 with the shaving head assembly removed, FIG. 3 is an axial view of the secondary section of the starting coupling, at the same time return-motion stop, used in the dry-shaving apparatus of FIG. 1, the fly weights of the primary coupling section which cooperate with the secondary section being also shown, and FIG. 4 schematically shows a similar view as that of FIG. 3, with one fly weight only, a number of arrows and angles being indicated to clarify the theoretical backgrounds of the coupling.

The dry-shaving apparatus 1 of FIG. 1 comprises a motor housing 2 and a shaving head assembly 3. The motor housing 2 accommodates an electric single-phase synchronous motor 4 which is mounted on a motor plate 5. A mounting plate 6 rests on the motor plate 5. In FIG. 1 many details which are irrelevant to the invention have been omitted, such as the manner in which the motor housing 2, the motor plate 5, the mounting plate 6 and the shaving head assembly 3 are connected to each other. At the top of the shaving head assembly 3 two cutter guards 7 are fitted.

The synchronous motor 4 comprises a lamination core 8. Said core is substantially U-shaped and has two parallel legs 9, one of which is visible in the Figure. A coil 10 is disposed on each of the legs 9. At their ends a cylindrical, permanent magnet rotor 11 is journalled between the legs 9. The spindle 12 of the rotor 11 is journalled in the motor plate 5 and at the opposite side in a bearing bracket 13, which is secured to the lamination core 8 in a manner not shown. The rotor 4 is also firmly secured to the motor plate 5 in a manner not shown. At the side of the motor plate 5 which faces away from the motor 4 a gearwheel 5 is fitted at the protruding end of the rotor spindle 12 by means of a notched member 14 which is disposed on the motor shaft. Said gearwheel drives the starting coupling 16, which also forms the return-motion stop. The latter is journalled on a spindle 17, which is fixed in the motor plate 5 and in the mounting plate 6, and comprises a primary section 18 and a secondary section 19 which cooperates therewith. To the primary member 18 two eccentrically journalled fly weights 20 and 21 are secured, which can pivot about eccentric bearing spindles 22 and 23. These bearing spindles are mounted in the flanged portion 24 of the gearwheel 25 which cooperates with the gearwheel 15 and which is loosely rotatable about the spindle 17. The secondary section 19 of the starting coupling 14 also comprises a gearwheel 26, which is integral with a drum-shaped member 27. The secondary section 19 is also loosely rotatable about the spindle 17. On the mounting plate 6 a splined shaft 28 is mounted with the aid of a splined member 29. A gearwheel 30 is loosely rotatable about the shaft 28 and cooperates with the gearwheel 26 of the secondary section of the starting coupling. The manner in which the gearwheel 30 cooperates with other transmission parts for driving the cutters associated with the cutter guards 7 is not shown in the drawing and is irrelevant to the invention.

FIG. 3 illustrates the shape of the two fly weights 20 and 21 and their bearing. The two fly weights comprise a substantially semi-circular portion 31 and 32 respectively, provided with lugs 33 and 34 which are fitted on the two bearing spindles 22 and 23. Each of the fly weights has a tab 35 and 36 respectively, by means of which they cooperate with the inner circumference 37 of the drum-shaped member 27 of the secondary coupling section. The fly weights 22 and 21 are made of sheet metal and are pivotable about the bearing spindles 22 and 23 in a plane parallel to the plane of drawing.

The operation of the coupling is discussed with reference to FIGS. 3 and 4. When the synchronous motor 4 is connected to the electric a. c. mains, the rotor 11 will start to rotate in either direction of rotation. The desired direction of rotation of the coupling, which is directly related to the desired direction of rotation of the synchronous motor is designated by the arrow P in FIG. 3. Assuming that after connection to the electric mains the motor rotates in such a direction that the fly weights of the primary coupling section are actually moved in the direction of rotation P, the coupling will operate as follows. At an alternating current frequency of 50 Hz the rotor 11 come up to the synchronous speed within a time interval of two hundredths of a second. Owing to the substantial angular change to which the two fly weights 20 and 21 are subjected during this very short starting period, they will initially swing about their bearing spindles in a direction towards the spindle 17. This yields the considerable advantage that owing to the swinging motion the fly weights temporarily contribute less to the reduced mass moment of inertia at the rotor spindle. However, the centrifugal forces acting on the fly weights, which will rapidly increase with the speed of the primary coupling section, tend to make the fly weights swing in an opposite direction, until the tabs 35 and 36 are pressed against the inner surface 37 of the drum-shaped member 27 of the secondary coupling, after which pivoting further is no longer possible. Owing to the frictional forces which are produced between the said tabs and the inner surface of the drum 27, a torque will be exerted on the secondary coupling section, so that the secondary coupling section as well as the other parts coupled thereto by means of the gear transmission will undergo the acceleration. Now, it is essential that during operation the torque to be produced never exceeds the torque that can be produced by the synchronous motor, because otherwise a difference in speed is obtained between the primary and the secondary section of the starting coupling, resulting in slip between the tabs 35 and 36 of the fly weights and the inner circumference 37 of the drum-shaped member 27. This will give rise to wear, loss of energy and other undesired effects. However, during the starting phase slip is permissible. In this phase the starting coupling functions as a moment-limiter, so that the moment to be produced by the synchronous motor never exceeds the maximum permissible value. During the starting phase the secondary section 19 of the starting coupling and the parts of the dry-shaving apparatus coupled thereto are accelerated owing to the torque thus limited, until the speed of the primary and that of the secondary section of the starting coupling are equal. Consequently, the coupling will produce slip during the starting phase only. In the coupling according to the invention the moment exerted on the secondary coupling section by the primary section during said phase is substantially independent of the coefficient of friction between the two tabs 35 and 36 of the fly weights 20 and 21 and the inner circumference 37 of the drum 27. The theory on which this is based will be explained with reference to FIG. 4.

For clarity FIG. 4 shows only one fly weight, viz., the fly weight 20. Point L is the projection of the centre line of the bearing spindle 22 on the plane of drawing and point M the projection of the centre line of the spindle 17 on the plane of drawing. The centre of the part of the tab 35 which cooperates with the inner circumference 37 of the drum 27 is designated by the letter A.

The centre of gravity of the fly weight 21 is designated by the letter Z. The angle, measured from the point M, between L and point A where the fly weight 20 cooperates with the drum 27, is designated by $\alpha$ and varies between 150° and 180°. Furthermore, the angle measured from point M, between point L and the centre of gravity Z of the fly weight 20, which angle is designated by $\beta$, is 90°. The balance of moments of the fly weight 20 about point L is as follows:

$$\Sigma M_L = F_z.a - F_t.b - F_n.c = 0 \qquad (1)$$

where:
- $F_z$ : centrifugal force acting in Z
- $F_t$ : tangential force acting in A
- $F_n$ : normal force acting in A
- $a$ : distance from L to the line of action of Fz
- $b$ : a distance from L to the line of action of $F_t$
- $c$ : a distance from L to the line of action of $F_n$ and, furthermore:

$$F_t = \mu F_n \qquad (2)$$

where
- $\mu$: the coefficient of friction in A.

In equation (1) the two distances $b$ and $c$ depend on the magnitude of the angle $\alpha$. If the angle is 180°, formula (1) may be simplified to:

$$\Sigma M_L = F_z.a - F_t(a + R) = 0 \qquad (3)$$

where
- $R$: radius of inner circumference 37.

In equation (3) $F_z$, $a$ and $R$ are constants, so that $F_t$ must also be constant. It follows that at an angle $\alpha = 180°$ the moment imparted to the secondary coupling section by the primary coupling section, which for the coupling of FIG. 3, which is equipped with two fly weights, will equal 2. $F_t.R$, is independent of the coefficient of friction $\mu$. If $\alpha$ is not smaller than 150°, the coefficient of friction will have some influence on the said torque, but to such a slight extent that this is acceptable for the proposed object.

In view of the dynamic behaviour of the coupling during the starting phase, it is desirable that the fly weights 20 and 21 have an as low as possible mass. The mass of the fly weights determines the magnitude of the force $F_z$, acting in the centre of gravity Z. If the angle $\beta$ does not equal approx. 90°, $F_z$ should not be inserted in the equations (1) and (3) but the projection thereof onto the normal through $M$ to the line $LM$. Said projection is always smaller than $F_z$ itself, so that an optimum use of the fly weight mass is obtained at an angle $\beta$ which is 90°.

If the motor rotates in such a direction that the fly weight 20 (see FIG. 4) is moved in a direction opposite to the arrow P, the force $F_t$ will also be opposite to the direction shown. The resulting rotation about L will bring point A in even more intimate contact with the inner circumference 37 of the drum 27, which will result in an increase of $F_n$ and thus of $Ft$. In this situation self-braking occurs, thus preventing slip. As the synchronous motor under these conditions cannot produce the torque required to overcome the reduced inertia at the motor spindle, it will move in the other direction during a subsequent halfcycle of the applied alternating voltage, in which direction the motor will then start in the manner described hereinbefore. Accordingly, the starting coupling automatically also acts as a return-motion stop.

What is claimed is:

1. An apparatus, such as an electrical domestic appliance, having a single phase synchronous motor and a starting coupling, comprising a rotatable primary section having one or more eccentrically journalled fly weights, and a rotatable secondary section which cooperates therewith and which is to be driven thereby, the angle measured from the axis of rotation of the primary coupling section, between the bearing axes of the fly weights and the points (A) where the fly weights cooperate with the secondary coupling section lies between 150° and 180°.

2. The apparatus as claimed in claim 1, wherein the angles measured from the axis of rotation of the primary coupling section, between the bearing axes of the fly weights and the centre of gravities thereof, are substantially 90°.

* * * * *

UNITED STATES PATENT OFFICE
CERTIFICATE OF CORRECTION

Patent No. 3,824,415         Dated  July 16, 1974

Inventor(s) BERNARD JOSEPH BEUSINK

It is certified that error appears in the above-identified patent and that said Letters Patent are hereby corrected as shown below:

IN THE CLAIMS

Claim 1, line 9, cancel "(A)";

line 11, "lies" should be --being--;

Signed and sealed this 15th day of October 1974.

(SEAL)
Attest:

McCOY M. GIBSON JR.          C. MARSHALL DANN
Attesting Officer            Commissioner of Patents